United States Patent [19]

Koorn et al.

[11] Patent Number: 5,076,042
[45] Date of Patent: Dec. 31, 1991

[54] MOWING MACHINE

[75] Inventors: Maarten Koorn, Borneostraat; Sape Sikkema, Krugerstraat, both of Netherlands

[73] Assignee: C. van der Lely N.V., Maasland, Netherlands

[21] Appl. No.: 549,436

[22] Filed: Jul. 6, 1990

[30] Foreign Application Priority Data

Jul. 6, 1989 [NL] Netherlands ............. 8901721

[51] Int. Cl.$^5$ .............. A01D 34/66; A01D 34/82
[52] U.S. Cl. .......................... 56/6; 56/15.2; 56/15.5; 56/13.8; 56/DIG. 14
[58] Field of Search ............ 56/6, 15.2, 15.5, 15.6, 56/15.9, 13.6, 13.8, DIG. 6, DIG. 9, DIG. 14

[56] References Cited

U.S. PATENT DOCUMENTS 3,717,981 2/1973 van der Lely ................ 56/6
4,185,445 1/1956 van der Lely ................ 56/6
4,858,418 8/1989 von Allwoerden ........... 56/15.2
4,972,664 11/1990 Frey ............................. 56/13.6

FOREIGN PATENT DOCUMENTS 0027295 4/1981 European Pat. Off. .

Primary Examiner—Terry L. Melius
Attorney, Agent, or Firm—Penrose Lucas Albright

[57] ABSTRACT

A mowing machine comprises a mowing unit and a crushing unit, both suspended in a first frame, the first frame together with the mowing unit (8) and the crushing unit also being suspended
 either to the leading end of a second frame which is provided with ground engaging wheels and a drawbar for connection behind a tractor,
 or to the lifting hitch at the front side of the tractor.
The same type mowing machine is also operable at the forward end of the tractor as well as to the tractor's rear at the left or right side.

15 Claims, 3 Drawing Sheets

MOWING MACHINE

FIELD OF THE INVENTION

The present invention relates to a mowing machine comprising a mowing unit, and a crushing unit suspended in a first frame as well as a second frame, which is supported by wheels and can be coupled to the rear of a tractor by means of a drawbar.

BACKGROUND OF THE INVENTION

It is known to couple a mowing unit and a crushing unit suspended in a first frame to the leading end of a second frame. This facilitates the use of comparatively heavy mowing and crushing units. In addition, mowing machines are being produced that are carried by a lifting hitch provided at the forward part of the tractor.

SUMMARY OF THE INVENTION

An object of invention is to provide a mowing machine which will be of interest for both the market of drawn mowing machines and that of front-mounted mowers. Therefore, according to the invention, the mowing machine in accordance with the invention, is characterized in that the mowing unit and the crushing unit, which can be coupled to the leading end of the second frame and are suspended in the first frame, can also be coupled to the lifting hitch provided at the forward end of the tractor. From a production-technical point of view it is of great advantage when the same frame-suspended mowing unit and crushing unit can be used both for a drawn mowing machine and for a front-mounted mowing machine.

In addition, also according to the invention, drive means connected to the first frame for driving the mowing unit and the crushing unit can be coupled both to a transmission box connected to the second frame, which box itself can be coupled to the power take-off shaft at the rear side of the tractor, and to the power take-off shaft at the front of the tractor. Consequently, the connections of the drive means of the mowing unit and the crushing unit remain the same, irrespective of whether the mowing unit and the crushing unit are used in a drawn mowing machine or in a front-mounted mowing machine.

In a concrete embodiment in accordance with the invention, t he coupling means between the first and the second frame include two substantially parallel lower carrier beams which, are connected to the first and the second frame so as to be capable of pivotal movement in a vertical plane at substantially the same level, an upper carrier beam which is connected to the first and the second frame that is capable of pivotal movement in a vertical plane, and one or more weight relief springs arranged between the first and the second frame. The structure of the coupling means between the first and the second frame corresponds to that of the coupling means between the frame wherein the mowing unit and the crushing unit are suspended and the trestle by means of which the mowing machine is coupled to the three-point lifting hitch at the front of the tractor, as has been disclosed in Netherlands Patent Application No. 8801040. The use of such coupling means in a drawn mowing machine results in further production-technical advantages.

Furthermore, in accordance with the invention, in the pivot of each of the lower carrier beams in the second frame there is provided a tilting plate which is also pivotable relative to the second frame, while between each of the lower carrier beams and a relevant tilting plate there is provided a hydraulic cylinder. Also in accordance with the invention, the triangular structure thus formed by a lower carrier beam, a tilting plate and a hydraulic cylinder is pivotable about the said pivot relative to the second frame between two stops, the mowing unit and the crushing unit suspended in the first frame being freely movable in an angular range determined by the said stops and the hydraulic cylinder.

Also in accordance with the invention, to the first frame there is connected a second transmission box, the ingoing shaft of which can be coupled via, is an example a flexible coupling to the outgoing shaft of the first transmission box connected to the second frame, the outgoing shafts of this second transmission box being used for driving the mowing unit or the crushing unit, respectively. More in particular, the first frame is provided with a first belt transmission unit to transfer the movement of a first outgoing shaft of the second transmission box to the mowing unit and a second belt transmission unit to transfer the movement of a second outgoing shaft of the second transmission box to the crushing unit, the belt transmission units being arranged on either side of the first frame. The use of two transmission boxes and the structure of the two belt transmission units, which are similar to those in the aforementioned Dutch patent application, result in additional production-technical advantages. In an advantageous embodiment in accordance with the invention, the first transmission box is arranged substantially halfway between the wheels on the second frame. Moreover, a third belt transmission unit is provided to transfer the movement of a transmission member connected to the power take-off shaft of the tractor to the ingoing shaft of the first transmission box. This transmission member is provided with at least one flexible coupling and, preferably, is mounted such that it extends through the drawbar. In a first embodiment according to the invention, the drawbar is connected to this second frame at the side thereof. In a second embodiment the drawbar is connected to the second frame in or near the middle thereof. This renders it possible, according to the invention, that the machine can be operable at the front side of the tractor as well as rearwardly at the left or right side.

For a better understanding of the invention and to show how the same may be carried into effect, reference will now be made, by way of example, to the accompanying drawings, in which:

DESCRIPTION OF THE PREFERRED EMBODIMENTS

Figure 1:
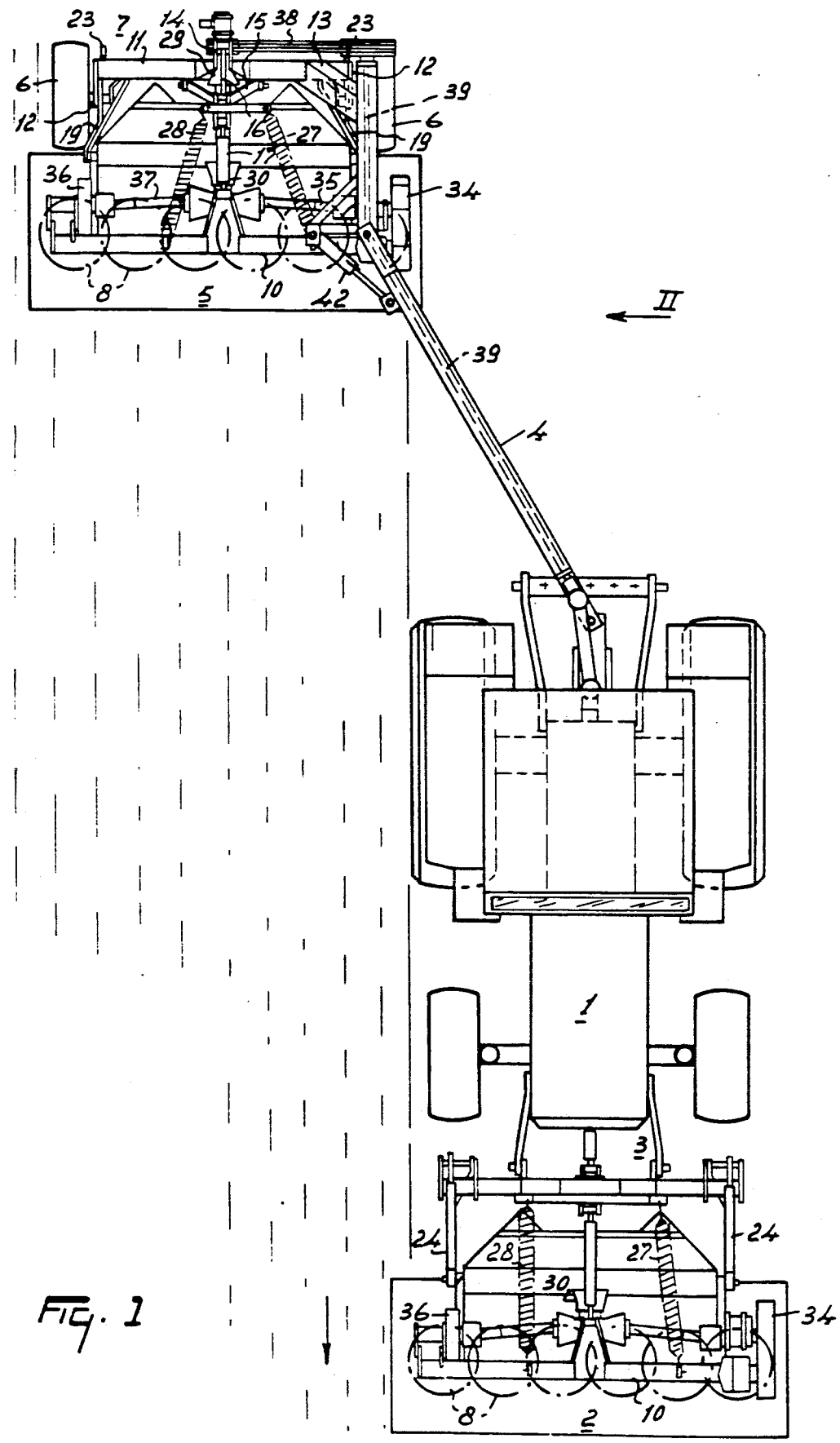
FIG. 1 is a view of a tractor provided with a front-mounted mowing machine and a drawn mowing machine.

The mowing machine combination in FIG. 1 shows a tractor 1 having coupled thereto at its of forward end a mowing machine 2 via a three-point lifting hitch 3. This mowing machine 2 comprises a mowing unit and a crushing unit and can be of a structure and be coupled as described in Netherlands Patent Application No. 8801040. To the rear of the tractor there is coupled a further mowing machine 5 by means of a drawbar 4. This mowing machine 5, also comprises a mowing unit and a crushing unit and can be of a structure and be coupled to a frame 7 supported by wheels 6 similar to mowing machine 2 coupled to the three-point lifting hitch provided at the forward end of the tractor 1.

Figure 2:
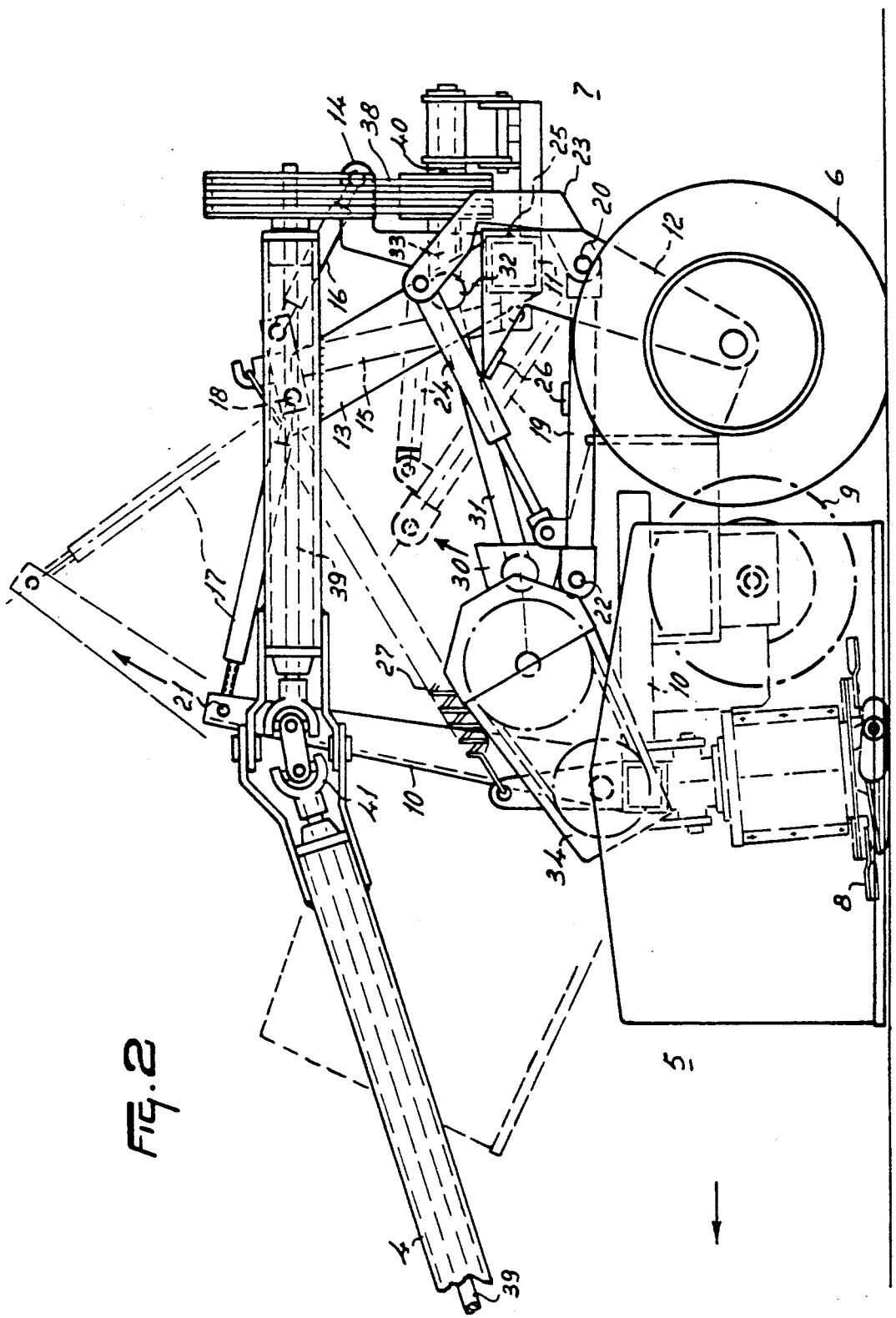
FIG. 2 illustrates the mode of coupling of a mowing unit and a crushing unit in a frame drawn by the tractor and supported by wheels, and FIG. 3 schematically illustrates the coupling of a mowing unit and a crushing unit in a frame supported by wheels and drawn at the left side or the right side behind the tractor.

The mowing unit designated generally in FIG. 2 by reference numeral 8 and the crushing unit designated generally by reference numeral 9 are suspended in a first frame 10. Via coupling means the first frame 10 is connected to the second frame 7 which is supported by wheels 6. The second frame 7 comprises a substantially horizontal supporting beam 11 which extends transversely to the direction of operative travel and at the sides of which there are provided wheel supports 12. The wheels 6 are bearing supported in the wheel supports 12 for rotation. To one of the sides of the second frame 7 there is attached a fastening member 13 for the drawbar 4. In addition, near the center of the supporting beam 11 there is arranged a supporting plate 14 connected thereto and at its lower ends a trestle 15 which is pivotable relative thereto and is part of the second frame. The top end of the trestle 15 is connected to the upper portion of the supporting plate 14 by means of a length-adjustable connecting rod 16. The position of the trestle 15 can be set with the aid of the connecting rod 16.

To the trestle 15, near its top end, there is fitted an upper carrier beam 17 which is pivotable in a vertical plane about a horizontal pivot pin 18. To each of the wheel supports 12 there is fitted a lower carrier beam 19 which is pivotable in a vertical plane about a horizontal pivot pin 20. The other end of the upper carrier beam 17 and the corresponding ends of the lower carrier beams 19 are connected pivotably to the first frame 10 about the pivot pins 21 and 22, respectively. The pivot pins 18, 20, 21 and 22 are positioned such that the upper carrier beam 17 together with each of the lower carrier beams 19 forms a quadrangular structure, in which connection, when the upper and lower carrier beams are moved about the pivot pins 18 and 20 relative to the second frame 7, the first frame 10 is subjected to a substantially vertical movement, during which movement the mowing and crushing unit, 8 and 9, is tilted to a slight extent.

Furthermore, about each of the pivot pins 20 there is arranged pivotably relative to a relevant wheel support 12 a tilting plate 23. A hydraulic cylinder 24 is provided between each of the lower carrier beams 19 and a relevant tilting plate 23. The pivotability of the triangular structure formed by a lower carrier beam 19, a relevant tilting plate 23 and a relevant hydraulic cylinder 24 is limited by two stops. The first stop is constituted by a plane 25, which faces the tilting plate 23 and is situated on the supporting beam 11. The second stop is constituted by a plane 26, which extends towards the lower carrier beam 19 and is situated on the wheel support 12. The triangular structure 19. 23. 24 is pivotable about the pivot pin 20, but its range of pivotal movement is limited by the two stops and by the position of the hydraulic cylinder 24.

Between the top end of the trestle 15 and the first frame 10 there are provided two weight relief springs 27 and 28. The weight relief springs are located on either side of the center of gravity of the mowing machine, the frame included. In FIG. 1 it is shown that this center of gravity does not coincide with the center of the machine; the weight relief springs are positioned asymmetrically relative to the center of the machine.

FIG. 2 shows the mowing machine in the operative condition. The triangular structure 19, 23, 24 is free from both stops. When, during operation, the mowing machine is moved across the field, then, partly owing to the weight relief springs, it adopts readily across all types of underlying irregularities that may be incountered. The mowing machine can be moved freely in the vertical direction through an arc that is determined by the hydraulic cylinders 24 and the two stops. By adjusting the hydraulic cylinders 24 differently, it is possible to alter the arc to be made by the mowing machine in the vertical direction, during operation. In the non-operative condition and in the transport position, that side of the triangular structure 19, 23, 24 that is constituted by the hydraulic cylinder 24 is shortened considerably, as a result of which the tilting plates 23 are urged against the first stop 25 and the lower carrier beams 19 and, consequently, the first frame 10 is moved upwardly.

A first transmission box 29 is arranged on the second frame 7 and a second transmission box 30 on the first frame 10. The ingoing shaft 31 of the second transmission box 30 is coupled to the outgoing shaft 33 of the first transmission box 29 via a flexible coupling 32. The outgoing shafts of the second transmission box 30 serve for driving the mowing unit 8 and the crushing unit 9, respectively. On the first frame 10 there is arranged at one side a first belt transmission unit 34 transferring the movement of a first outgoing shaft 35 of the second transmission box 30 to the mowing unit 8. At the other side of the first frame 10 there is arranged a second belt transmission unit 36 transferring the movement of a second outgoing shaft 37 to the crushing unit 9. The first transmission box 29 is arranged substantially halfway between the wheels 6 on the second frame 7. In addition, there is provided a third belt transmission unit 38 transferring the movement of a transmission member 39 connected to the power take-off shaft to the ingoing shaft 40 of the first transmission box 29. The transmission member 39 comprises one or more flexible couplings 41 and extends through the drawbar 4. The drawbar 4 consists of sections which are pivotable relative to each other about a substantially vertical axis, while the flexible coupling 41 is arranged in the region of the pivotal connection in the drawbar. This pivotal connection can be locked by means of a hydraulic cylinder 42.

Figure 3:
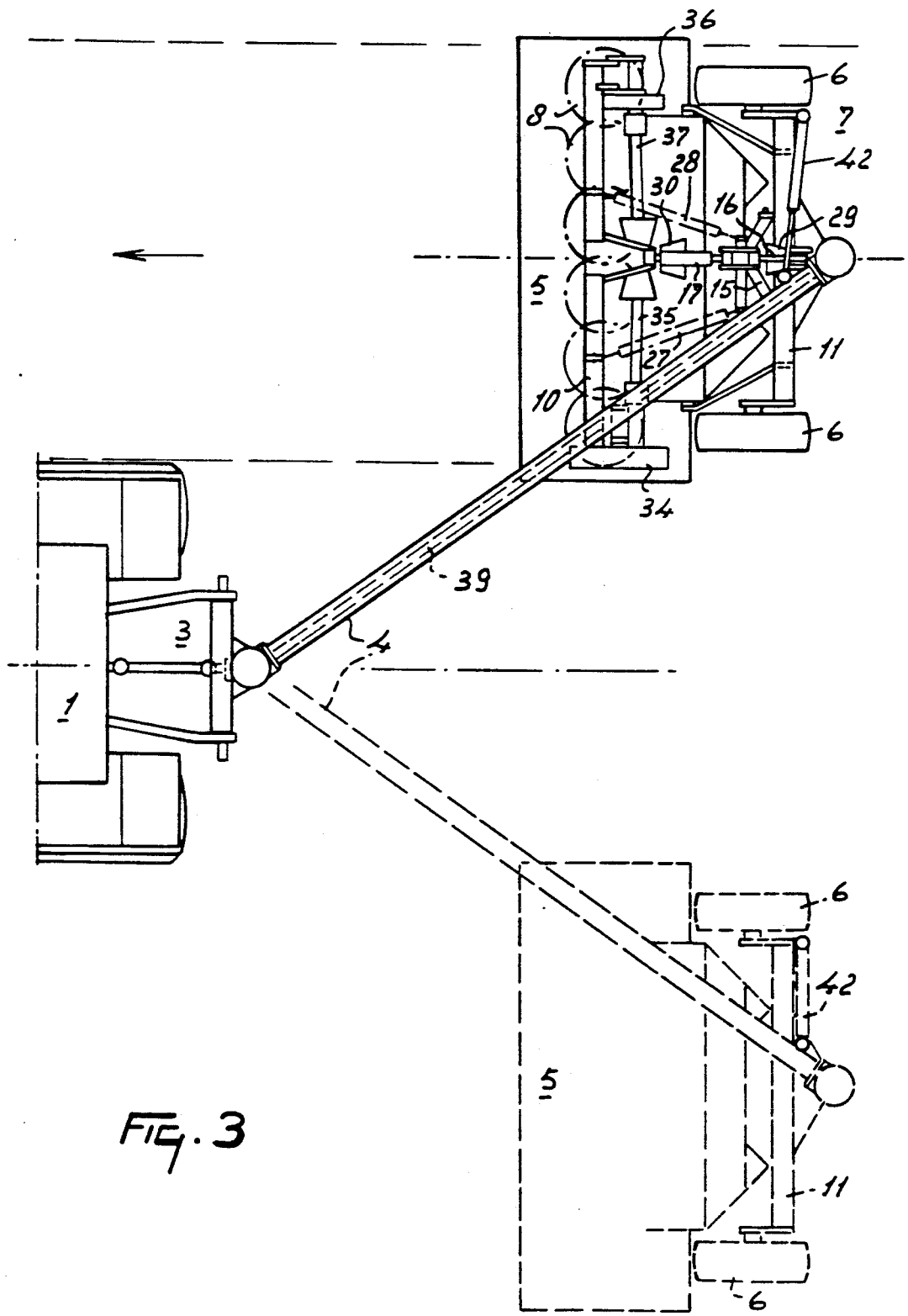

The mowing machine shown in FIG. 3 is identical to the one shown in FIGS. 1 and 2, on the understanding that the drawbar 4 is connected to the second frame 7 in or near the middle thereof. This renders it possible for the mowing machine 5 to be operable both at the left side and at the right side behind the tractor 1. In this embodiment, the third belt transmission unit 38 is redundant. The movement of the transmission member 39 connected to the power take-off shaft can be transferred directly to the ingoing shaft 40 of the first transmission box 29. The connection of the drawbar 4 and transmission member 39 to the tractor 1 and the power take-off shaft at the one side as well as to the middle of the second frame 7 and the ingoing shaft 40 of the first transmission box 29 at the other can be effected by variety of well known expedients such as, for example, disclosed in European Patent Application No. 0 027 295.

Having disclosed our invention, what we claim as new and to be secured by Letters Patent of the United States is:

1. A mowing machine comprising a mowing unit and a crushing unit that are suspended by a first frame as well as by a second frame which is supported by ground engaging wheels and is adapted to be coupled to the rear of a tractor by a drawbar, said mowing unit and said crushing unit being coupled to the leading end of said second frame and suspended from said first frame also including connection means adapted to be coupled to a lifting hitch provided at the forward end of said tractor, and weight relief resilient means arranged between said first and second frames which also can be arranged between said lifting hitch and said first frame.

2. A mowing machine as claimed in claim 1, further comprising drive means connected to said first frame for driving said mowing unit and said crushing unit, said drive means adapted to be coupled both to a transmission box connected to said second frame wherein said transmission box is adapted to be coupled to said tractor's power take-off shaft projecting from the rear of said tractor, and selectively to a further power take-off shaft extending from the forward end of said tractor.

3. A mowing machine as claimed in claim 2 comprising a second transmission box connected to said first frame, said second transmission box having an input shaft adapted to be coupled via universal coupling means to an output shaft of said first mentioned transmission box, said first mentioned transmission box being connected to said second frame, a pair of output shafts of said second transmission box being connected for driving said mowing unit and said crushing unit, respectively.

4. A mowing machine as claimed in claim 3, wherein said first frame is provided with a first belt transmission unit that transfers rotational movement of a first of said pair of output shafts of said second transmission box to said mowing unit and with a second belt transmission unit to transfer the rotational movement of a second of said pair of output shafts of said second transmission box to said crushing unit, said belt transmission units being mounted on said first frame on opposite lateral sides thereof.

5. A mowing machine as claimed in claim 3, wherein said first mentioned transmission box is arranged substantially halfway between said wheels on said second frame.

6. A mowing machine as claimed in claim 5, comprising a third belt transmission unit that transfers the rotational movement of a transmission member connected to a said power take-off shaft of said tractor to an input shaft of said first mentioned transmission box.

7. A mowing machine as claimed in claim 6, wherein said transmission member comprises a flexible coupling and extends through said drawbar.

8. A mowing machine as claimed in claim 7, wherein said drawbar is connected to said second frame at one lateral side thereof.

9. A mowing machine as claimed in claim 7, wherein said drawbar is connected to said second frame near the middle thereof.

10. A mowing machine as claimed in claim 9, wherein the machine is selectively connectable to said tractor's forward end and via said drawbar at the left or right side and rearwardly of said tractor.

11. A mowing machine comprising a mowing unit and a crushing unit that are suspended by a first frame as well as by a second frame which is supported by ground engaging wheels and is adapted to be coupled to the rear of a tractor by a drawbar, said mowing unit and said crushing unit being coupled to the leading end of said second frame and suspended from said first frame also including connection means adapted to be coupled to a lifting hitch provided at the forward end of said tractor, coupling means between said first and second frames, said coupling means including two substantially parallel lower carrier beams which are connected to said first and second frames so as to be capable of pivotal movement in vertical planes at substantially the same level, an upper carrier beam which is connected to said first and second frames so as to be capable of pivotal movement in a further vertical plane between said first mentioned vertical planes, and at least one weight relief spring arranged between said first and second frames.

12. A mowing machine as claimed in claim 11 wherein each of said two lower carrier beams includes a pivot member in said second frame, and further comprising tilting plates which are also pivotable relative to said second frame's lower carrier beams, and hydraulic cylinders, a corresponding hydraulic cylinder connecting a corresponding said tilting plate with a corresponding said lower carrier beam.

13. A mowing machine as claimed in claim 12 wherein the triangular structures formed by each of said lower carrier beam, the corresponding said tilting plate and the corresponding said hydraulic cylinder, are pivotable about the said pivot member relative to said second frame between two stops, said mowing unit and said crushing unit suspended in said first frame being freely movable within an angular range determined by said stops and said hydraulic cylinder.

14. A mowing machine for combination with a tractor having both a forward lifting device and a rear lifting device, a forward power take-off associated with said forward lifting device, and a rear power take-off associated with said rear lifting device, said mowing machine comprising:

a mowing unit;

a crushing unit;

transmission means for driving said mowing unit and said crushing unit;

a first frame supporting said mowing unit, said crushing unit, and said transmission means;

a second frame supported by ground engaging wheels, said second frame selectively connectible with a drawbar and a transmission member adapted to be coupled respectively to said tractor's rear lifting device and rear power take-off, said mowing unit and said crushing unit being coupled to the leading end of said second frame and suspended from said first frame, and said transmission means being operatively connectible to said transmission member, whereby said mowing machine is operatively connectible to the rear of said tractor via said drawbar and said transmission member; and a trestle selectively mountable on said tractor's forward lifting device, whereby said first frame, together with said mowing and crushing units, and said transmission means suspended therefrom, is adapted to be connected to said trestle mounted on said tractor's forward lifting device, with said transmission means being connected to said forward power take-off, whereby the mowing machine is operably mounted to the front of said tractor.

15. A mowing machine in accordance with claim 14, further comprising weight relief resilient means adapted to be arranged between said first and second frames, which is also adapted to be arranged between said trestle and said first frame.

* * * * *